Sept. 5, 1939.   M. H. DUVAL ET AL   2,171,922
APPARATUS FOR THE TREATMENT OF BAKERY PRODUCTS
Filed Oct. 30, 1936   9 Sheets—Sheet 2

Inventors
Montague H. Duval.
Ralph Vezin.
By Cushman, Darby & Cushman
Attorneys

Sept. 5, 1939.　　　M. H. DUVAL ET AL　　　2,171,922
APPARATUS FOR THE TREATMENT OF BAKERY PRODUCTS
Filed Oct. 30, 1936　　　9 Sheets-Sheet 4

Inventors
Montague H. Duval,
Ralph Vezin.

Sept. 5, 1939. M. H. DUVAL ET AL 2,171,922
APPARATUS FOR THE TREATMENT OF BAKERY PRODUCTS
Filed Oct. 30, 1936 9 Sheets-Sheet 5

Inventors
Montague H. Duval,
Ralph Vezin
By Cushman, Darby & Cushman
Attorneys

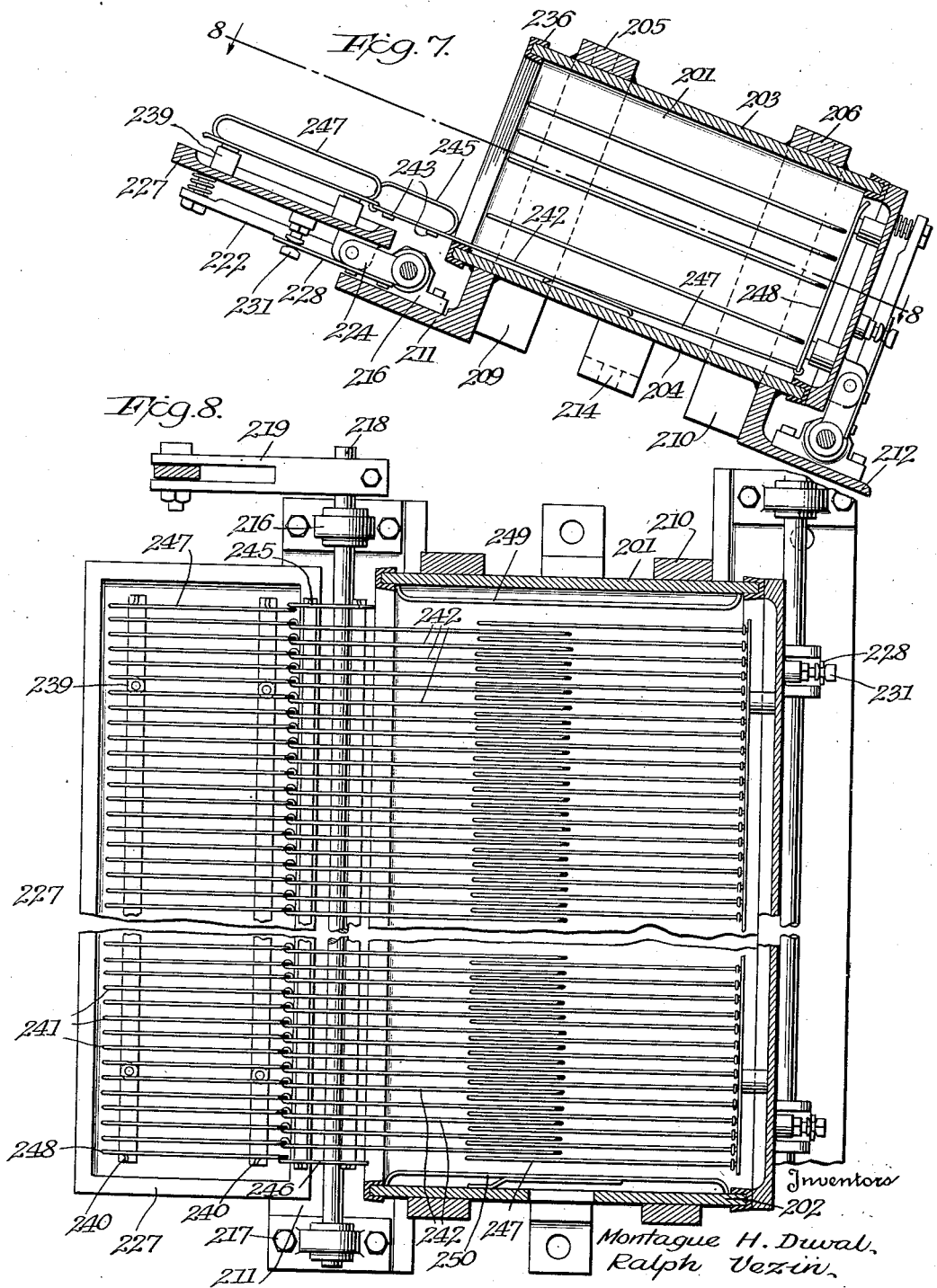

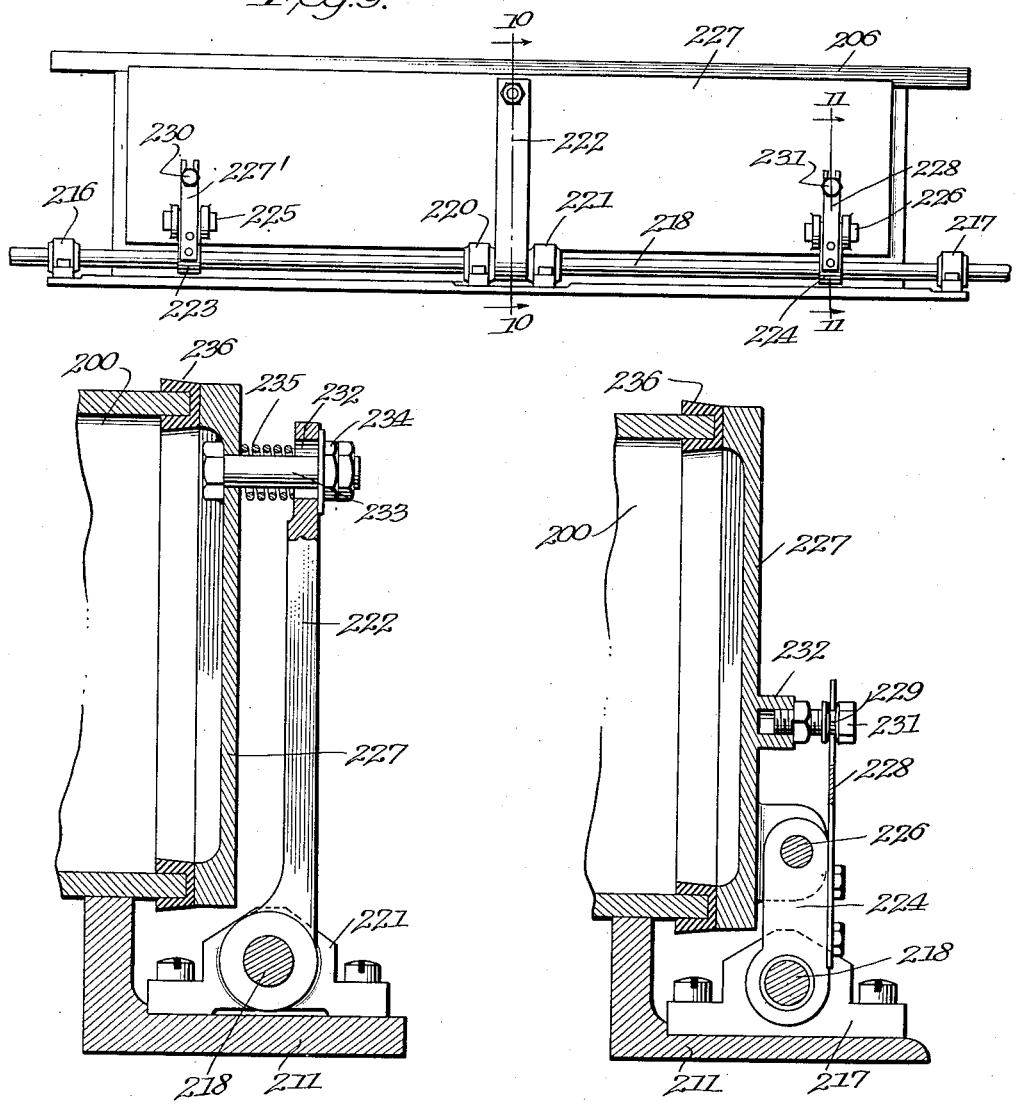

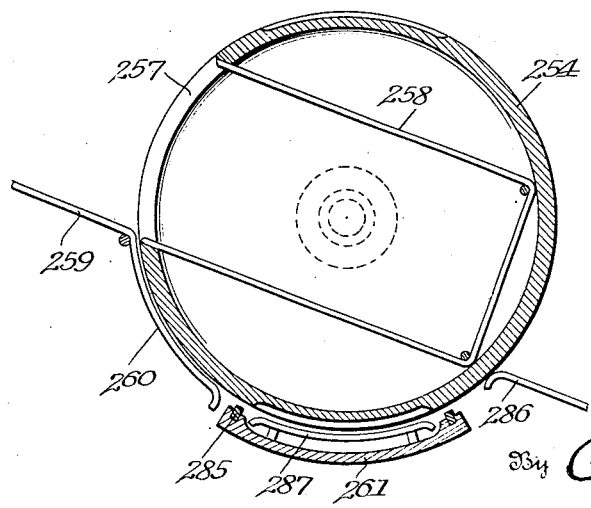

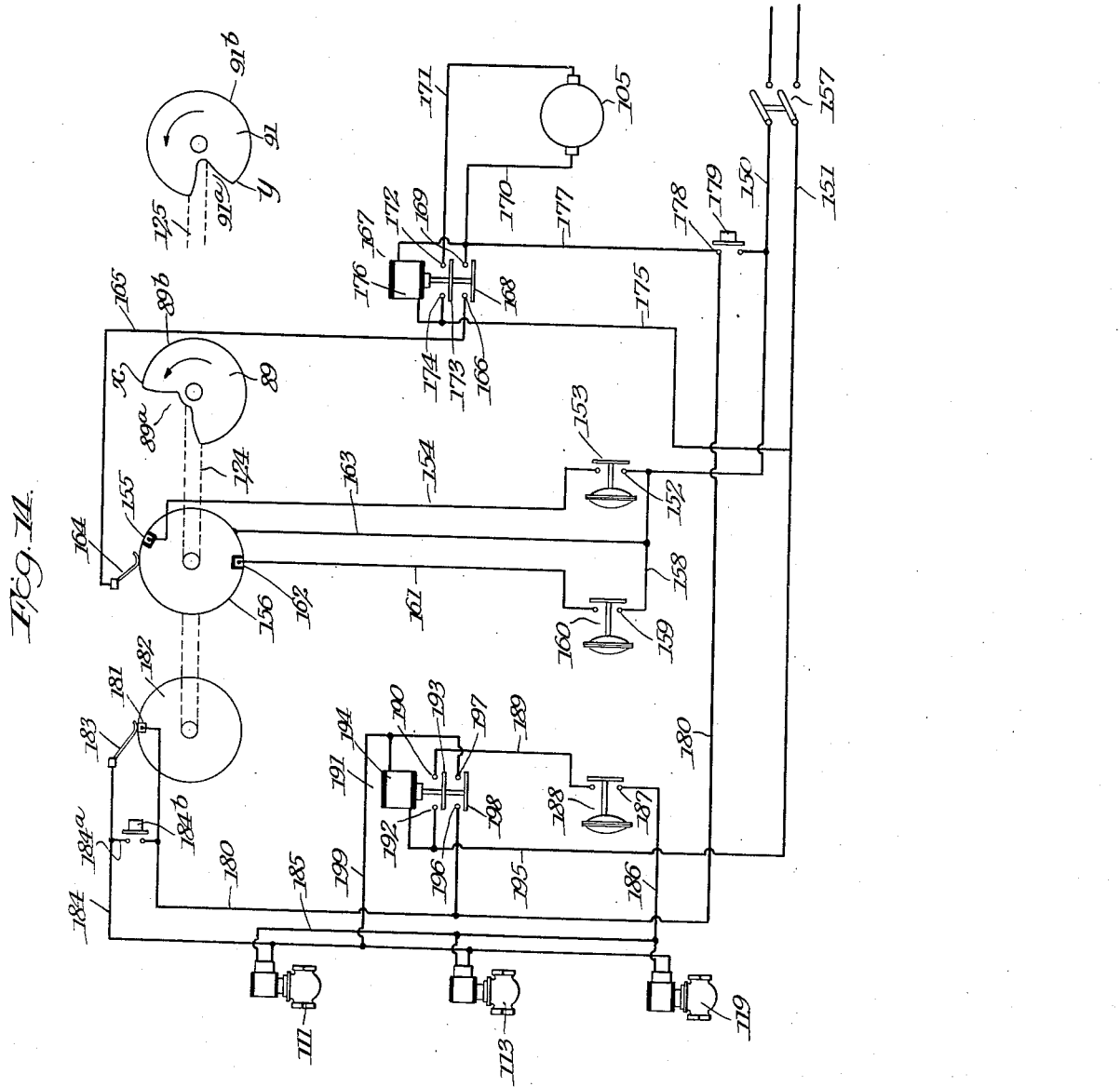

Patented Sept. 5, 1939

2,171,922

UNITED STATES PATENT OFFICE 2,171,922

APPARATUS FOR THE TREATMENT OF BAKERY PRODUCTS

Montague H. Duval, Roslyn, N. Y., and Ralph Vezin, Montclair, N. J.

Application October 30, 1936, Serial No. 108,484

14 Claims. (Cl. 34—12)

The present invention relates to an apparatus for cooling bread or bakery products in general and has as its principal purpose to enable the treatment to be efficiently carried out.

In the copending application of Montague H. Duval, Serial No. 27,127, filed June 17, 1935, there is described a method of treating bakery products, specifically bread, which involves first holding the loaves in a tempering zone and then passing them to a vacuum zone for final cooling. The present invention provides apparatus designed to carry out this method so that once the loaves are delivered to the apparatus, no further manual handling is necessary until the products are discharged in cooled condition.

Since the invention can be best described with reference to specific apparatus, we shall proceed with reference to the illustrative structures shown in the accompanying drawings, in which:

Figure 7 is a vertical section of a constituent part of the unit of Figure 6.

Figure 8 is a section substantially on line 8—8 of Figure 7.

Figure 9 is a front elevation of the devices of Figure 7.

Figure 10 is a section substantially on line 10—10 of Figure 9.

Figure 11 is a section substantially on line 11—11 of Figure 9.

Figure 12 is a side elevation of another form of vacuum unit.

Figure 13 is a partial vertical section of the unit in Figure 12, and

Figure 14 is a diagram of a control circuit.

Figure 1:
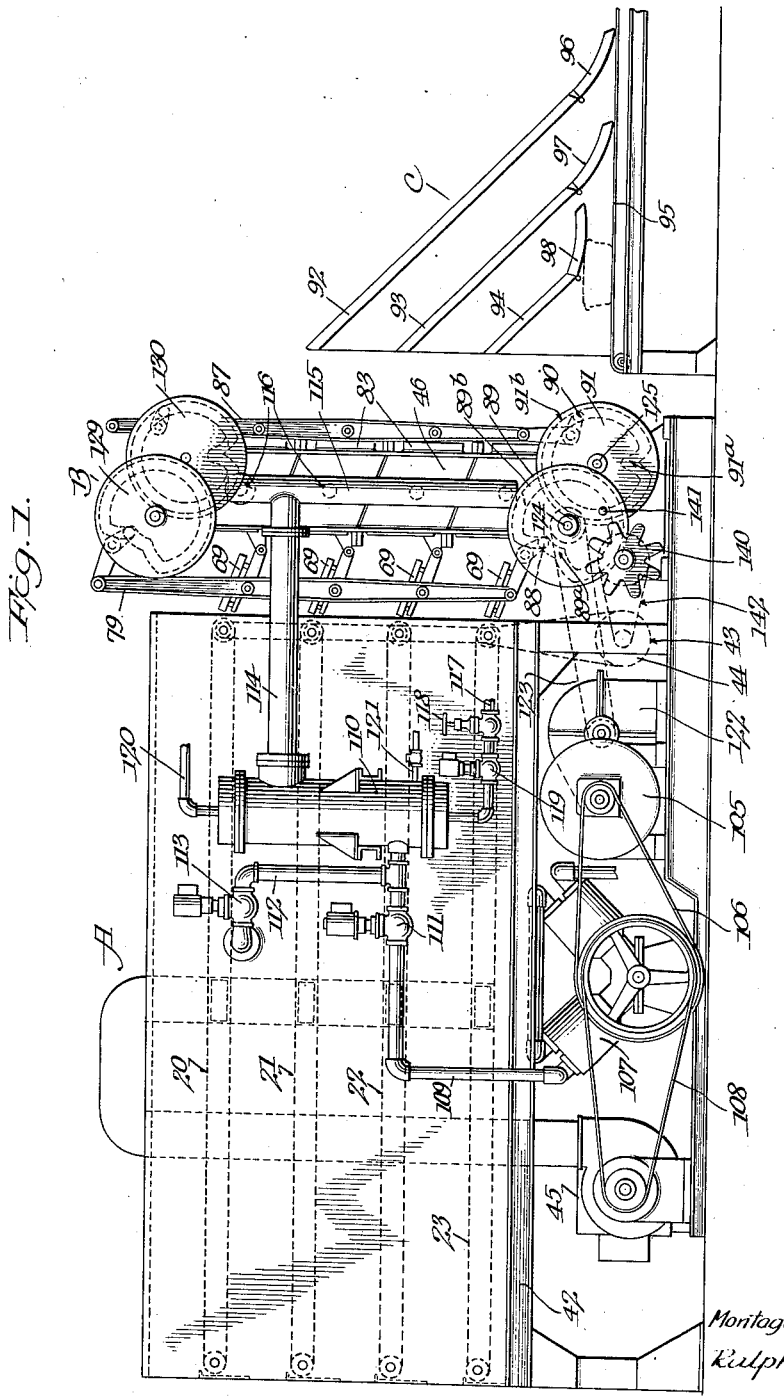
Figure 1 is a side elevation of a typical installation adapted to carry out the purposes of the invention.

Referring first to Figures 1 to 5, and in particular to Figure 1, reference character A designates a tempering chamber, B a vacuum unit, and C the receiving end of a slicing machine. The chamber A has side, top and bottom walls conveniently of plate metal and is open at its ends, as here shown, although movable end closures may be provided if desired. A number of horizontally disposed endless conveyors 20, 21, 22, and 23 are arranged in superposed relation in the chamber and extend from end to end thereof. The head and foot shafts of the conveyors are journalled in suitable bearings secured to the chamber side walls.

Figure 2:
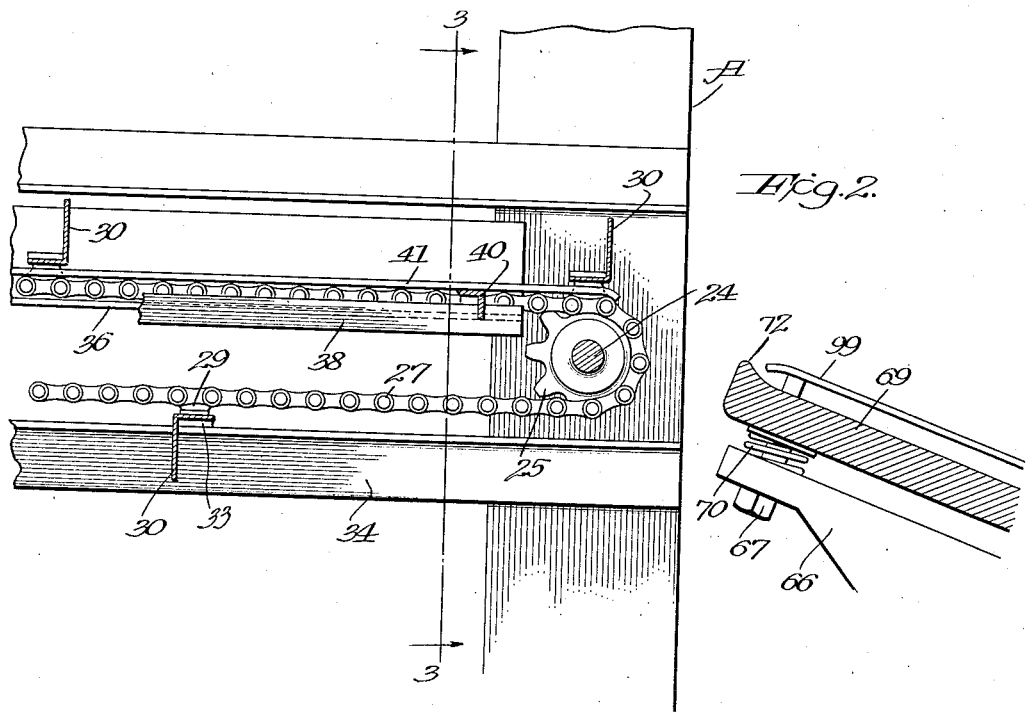
Figure 2 is a partial vertical section of the apparatus of Figure 1.
Figure 3:
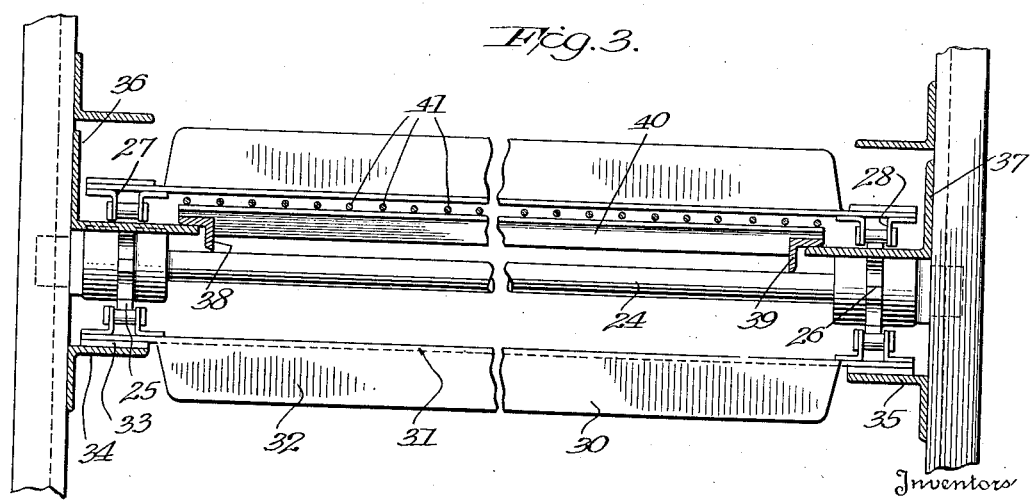
Figure 3 is a section substantially on line 3—3 of Figure 2.

Details of the conveyor construction are shown in Figures 2 and 3 wherein reference numeral 24 designates a foot shaft which has fixed thereto, adjacent the side walls, sprockets 25 and 26 which engage endless chains 27 and 28. At intervals the chains include links such as shown at 29, these links having side bars provided with foot portions secured as by welding to flights as at 30. The flights 30 are conveniently made from angle bars of which one flange 31 is secured to opposite links 29 with the other flange 32 projecting outwardly. The ends of the latter flange are discontinued adjacent the chains and at these points, wear pieces, as at 33, are secured to the outer faces of flanges 31, these wear pieces, on the lower run of the conveyor, sliding on the horizontal flanges of angle bars 34 and 35 whose other flanges are secured to the inner faces of the side walls. The upper runs of the chains slide on the horizontal flanges of similarly arranged angles 36 and 37, which extend between the head and foot sprockets, the horizontal flanges of these angles projecting inwardly a substantial distance beyond the chains.

A frame consisting of longitudinally extending angles 38 and 39 connected by cross angles as at 40, rests on the inner margins of the flanges of angles 36 and 37 in the manner shown in Figure 3 and extends between the head and foot sprockets. Fixed to the top of the cross members 40 is a longitudinally extending series of wires or rods constituting a rack 41 and the ends of these wires extend over the foot shaft 24 as shown in Figure 2. The rack 41 is disposed just beneath the path of the flights 30 on the upper run of the conveyor.

The chamber A is preferably supported in the somewhat elevated position as shown in Figure 1 on an under frame which includes top longitudinal sills as at 42. The lowermost conveyor 23 is thus at a somewhat elevated position for convenient loading.

The foot shaft of the lowermost conveyor 23 has a sprocket fixed thereon adapted to be driven by a chain 43 whose other end engages a sprocket 44 suitably journalled on the under frame. Another sprocket fixed on the foot shaft of the lowermost conveyor is connected by a chain with a sprocket fixed on the foot shaft of the next higher conveyor, a second sprocket on the last named foot shaft being connected by means of a chain to the sprocket on the foot shaft of the next higher conveyor etc., so that when the sprocket 44 is driven, all the conveyors will be driven simultaneously and equally.

Desirably, the left hand end of the chamber A, Figure 1, is adjacent the oven so that the hot products coming from the oven may be directly transferred to the receiving ends of the racks 41. It will be understood that as the flights 30 rise to the upper run, they engage the products and slide them along the racks to the other end of the chamber and there discharge them.

In accordance with the method described in the application mentioned at the outset, the products are required to remain in a tempering chamber for a certain period before being subjected to vacuum cooling. In the embodiment of the invention herein disclosed, an intermediate drive is contemplated for the conveyors. Assuming that the tempering period is thirty minutes and that the conveyors are advanced twelve inches every two minutes, then the necessary length of the tempering chamber will be fifteen feet since it will take the products thirty minutes to traverse a chamber of this length. The chamber is ordinarily filled with washed air which is fed through by a blower 45, Figure 1, and ducts in connection with the blower may be arranged in the chamber to secure proper air circulation.

Disposed at the discharge end of the chamber A is the vacuum unit B which is made up of a battery of superposed chambers 46 equal in number to the conveyors in the tempering chamber. The chambers 46 are identical in construction and consequently, may be combined in any desired number. The system is thus extremely flexible since by merely varying the number or capacity of the conveyors and vacuum chambers, any size of output can be efficiently handled.

Each chamber 46, which may be made as a single casting, is substantially rectangular in transverse section and rhomboidal in longitudinal section and is substantially entirely open at its ends. The chamber has side walls as at 47, a top wall 48 and a bottom wall 49 and at its front end has upwardly and downwardly projecting flanges 50 and 51, there being similar flanges 52 and 53 at the rear end of the chamber. The front and rear flanges are joined by lateral flanges as at 54 and 55. Pairs of lugs as at 56 project outwardly from the top of flange 50 in a plane perpendicular to the plane of the chamber opening. Similar lugs 56' project from the top of flange 52 and further similar lugs 57 and 58 project from the lower edges of flanges 51 and 53.

The lugs 57 and 58 of the lowermost chamber 46 are received by seats as at 59 and 60 provided on a base 61, the lugs extending horizontally and the chamber openings, consequently, vertically. The lugs 57 and 58 are secured to the base while the top lugs 56 and 56' receive and are secured to the bottom lugs 57 and 58 of the chamber next above, etc., so that a vertical stack is built up.

A pair of ears 62 projects from the lower front flange 51 of each chamber and support a horizontal rock shaft 63 in parallel relation to the plane of the front opening of the chamber and somewhat below the opening. A similar pair of ears 64 project from the upper rear flange 52 and similarly support a shaft 65. The shaft 63 has a pair of arms as at 66 mounted thereon and the arms slidably receive cap screws 67 and 68 whose extremities are engaged in a cover plate or door 69 for the front opening of the chamber. Springs 70 and 71 are interposed between the door and the arms in order to permit the ribbed marginal portion 72 of the cover plate to seat yieldingly against the gasket 73 which is set in a channel formed around the chamber opening. The ears 62 of the lowermost chamber are designed to receive a rock shaft 74 of somewhat greater diameter than the shafts 63. Door-supporting arms 75 are fixed on shaft 74 as is also the crank arm 76.

The superposed door-supporting arms are pivoted as at 77 and 78 to a vertically extending bar 79. By reason of this parallelogram linkage, when crank arm 76 is actuated to rock shaft 74, all of the cover plates or doors are forced to move in unison. The rock shaft 80 journalled in bearings in the rear of base 61, has fixed thereto a crank arm 81 and arms 82 which carry a closure plate or door 83 for the discharge opening of the lowermost chamber. Similar door carrying arms are mounted on shafts 65 which are supported by the rearwardly extending ears 64 and all the arms are pivoted as at 85 and 86 to a vertical bar 87 so that the rear doors are all compelled to move in unison when shaft 80 is rocked as a result of the actuation of crank arm 81.

If desired, the chambers may each have the rearward ears 64 formed on their lower rear flanges 53, the ears being suitably shaped so as to position the shaft 65 or 80 properly. In this case, each chamber will be self-contained.

A crank pin at the free end of arm 76 carries a roller 88 which is engaged in the groove of a face cam 89, the groove having such an outline that upon rotation of the cam, the doors 69 will be moved between open and closed positions. When the doors are in open position, they lie substantially in the planes of the bottom walls 49 of the chambers and their outer edges are closely adjacent the ends of the conveyors as most clearly shown in Figures 4 and 5. Similarly, crank arm 81 carries a roller 90 which is engaged in the groove of a cam 91, rotation of the cam causing the doors 83 to be moved between open and closed positions. When in open position, the doors 83 lie in the plane of the bottom walls 49 of the chambers and their outer ends are in substantial alignment with the bottoms of chutes 92, 93 and 94 or, in the case of the lowermost door, adjacent the top of the conveyor table 95 disposed in advance of the slicer. The lower ends of the chutes have pivoted portions 96, 97 and 98 which are adapted to be swung upwardly upon engagement by loaves on the conveyor so that the loaves may pass. This operation is illustrated in Figure 1.

Each door 69 supports on short pedestals a grill 99 composed of wires extending substantially from top to bottom of the door. The lower ends of the wires are pivotally engaged at 100 to the ends of the similar wires of a grill 101. Each door 83 carries similar grills 102 and 103 and the free ends of grills 101 and 103 alternate with each other and with the wires of a grill 104 supported above the bottom wall 49 in the chamber.

Figure 5:
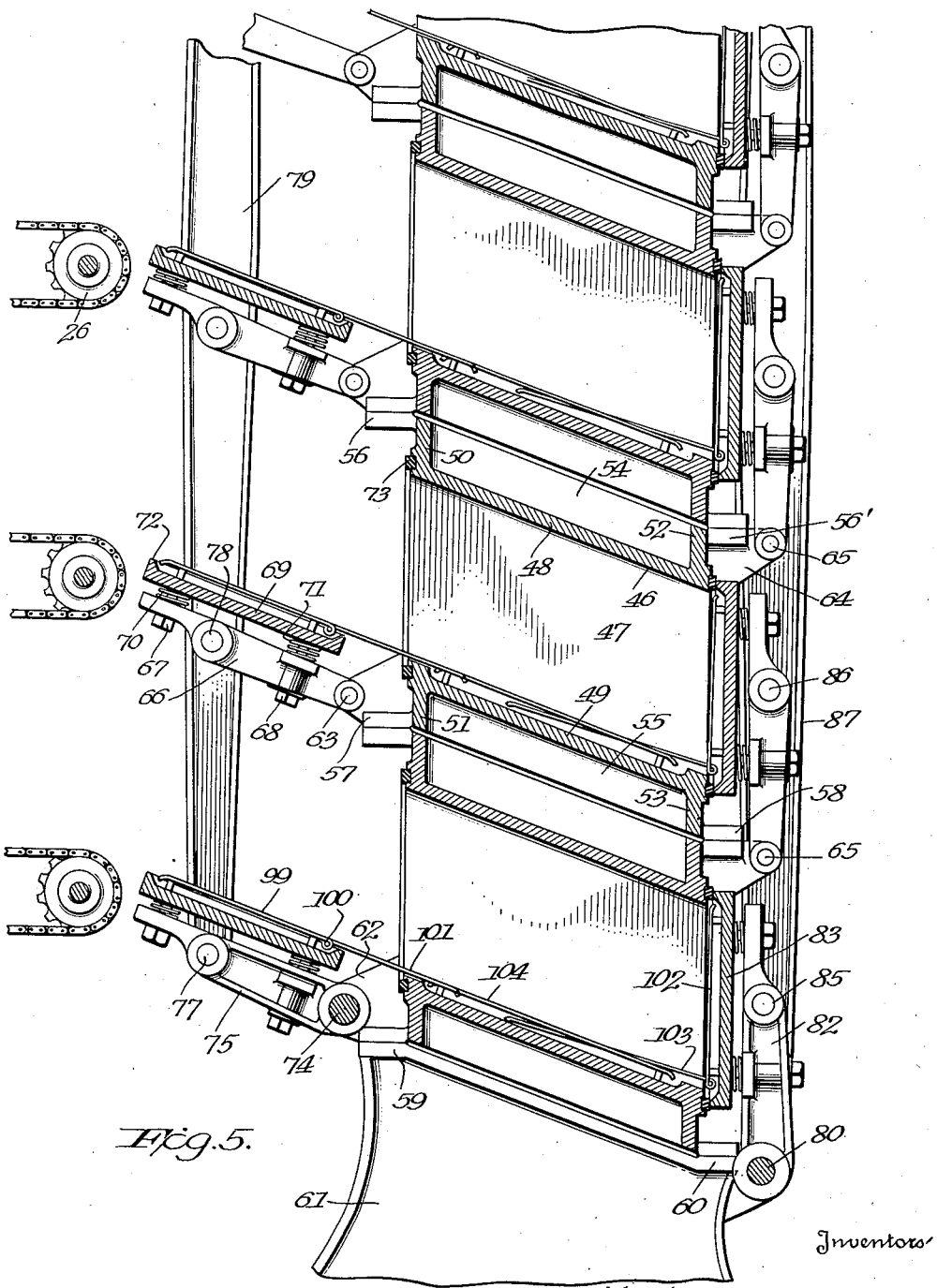
Figure 5 is a partial vertical segment of the vacuum unit of Figure 4.

When the door 69 is in the open position shown in Figure 5, the grill 101 bridges the gap between it and its associated chamber. Grill 103 performs a similar function when door 83 is open. Thus, with the doors 69 open, they serve as transfer chutes to receive the tempered products directly from the discharge ends of the conveyors and direct them smoothly to the interior of the chambers whose discharge ends are closed. When doors 83 are in open position, they serve as transfer chutes to direct the cooled products to the chutes 92, 93, 94 and table 95. The grills provide a smooth slideway for the loaves and are sufficiently inclined so that the loaves will gravitate along them at a suitable speed, the inclination of the grills being, of course, dependent upon the inclination of the chamber bottoms. The grills have the further function of keeping the products from contact with the chamber walls and, hence, free from injury by any condensation which might be present on the walls. As an additional safeguard, similar grills may be secured to the side walls of the chambers.

Referring to Figure 1, an electric motor 105 is mounted on the base frame of the tempering chamber and through a belt 106 drives the belt wheel of a vacuum pump 107. Another belt 108, engages the same belt wheel and drives the blower 45.

The pump 107, which is suitably supported on the base of chamber A, is connected by means of a pipe 109 with a condenser 110. A normally closed solenoid operated valve 111 is interposed in pipe 109 in advance of the condenser and between the latter and the valve a pipe 112 is branched into pipe 109. Pipe 112 leads to an opening in chamber A and has interposed therein a normally open solenoid operated valve 113.

The intake end of the condenser 110 is connected by means of a pipe 114 with a manifold 115 extending vertically at one side of the vacuum unit, the manifold being in communication with the several chambers through the ports 116.

Reference numeral 117 designates a cooling water supply line for the condenser and has interposed therein a manually operable valve 118 and a normally closed solenoid operated valve 119. An escape line for the cooling water is indicated at 120 and a condenser drainage line at 121, the latter being provided with a check valve which closes under the influence of a suction effect in the condenser.

The armature shaft of motor 105 is operatively associated with a speed reducer 122 and the output of the latter is transmitted by a chain 123 to a sprocket fixed on a shaft 124, journaled in base 61, to which cam 89 is also fixed. Cam 91 is fixed on a shaft 125 and this shaft has a sprocket fixed thereon and driven from a similar sprocket on shaft 124, also journaled in base 61, through a chain 126.

Cams 89 and 91, through the described connections, may both be driven in a counter-clockwise direction at the same speed.

Journaled in a frame mounted on the uppermost chamber are a pair of shafts 127 and 128 whose relative arrangement is the same as that of shafts 124 and 125. Shafts 127 and 128 have fixed thereon cams 129 and 130 identical with cams 89 and 91, respectively. A chain 131 connects sprockets fixed on shafts 124 and 127 and a chain 132 connects sprockets fixed on shafts 127 and 128 so that when cams 89 and 91 are driven, cams 129 and 130 are driven in the same direction and at the same speed.

A rock shaft 133 mounted on the top frame has fixed thereto an arm 134 which is pivoted at its extremity to bar 79. Also fixed on shaft 133 is a crank arm 135 which carries a roller 136 as a follower for cam 129. Another rock shaft 137 has fixed thereon a crank arm 138 which carries a roller 139 as a follower for cam 130. Also fixed on shaft 137 is an arm which is pivoted to bar 87.

It will be understood that the mechanism just described is merely a duplication of the operating mechanism at the base of the cooling unit. This auxiliary equipment is desirable in view of the heavy weights to be moved by the relatively short crank arms shown.

Rotatably mounted on the base 61 is a star wheel 140 with which coacts a roller 141 mounted on cam 89. A sprocket in fixed connection with the star wheel is connected by a chain 142 with a sprocket in fixed relation with the sprocket 44. Consequently, at each rotation of cam 89, roller 141 engages for a period a projection of the star wheel and rotates the latter through a certain angle. The rotation of the star wheel is communicated through the chain and sprocket gearing to the conveyors so that they are advanced a predetermined distance and consequently feed a charge to the vacuum chambers.

Cam 89 has the depressed portion 89a and the fully arcuate portion 89b concentric with shaft 124. Cam 91 has the depressed portion 91a and the fully arcuate portion 91b concentric with shaft 125.

Referring to Figure 1, roller 88 is in the depressed portion 89a of cam 89, whereas roller 90 is on the arcuate portion 91b of cam 91. This means that doors 69 are open and doors 83 closed. Roller 141 has engaged and released star wheel 140 so that the conveyors have been advanced and the vacuum chambers have been charged.

As the cams continue to rotate at a slow speed in a counter-clockwise direction, roller 88 rides up onto the arcuate portion 89b of cam 89 and doors 69 are closed. After a certain interval, roller 90 moves into the depressed portion 91a of cam 91 so that the doors 83 are opened and the loaves slide thereover to the chutes and table. Roller 90 now rides up again onto the arcuate portion 91b of cams 91 and doors 83 are closed. Hereupon the depressed portion 89a of cam 89 again reaches roller 88, the doors 69 are opened, and the star wheel again driven so that the conveyors are again advanced.

During the period both sets of doors 69 and 83 are closed, vacuum cooling must be carried out in the chambers. This means that during the interval when the chambers are closed, a vacuum must be induced in the chambers and released.

A suitable control system for the apparatus is shown in Figure 14 to which reference will now be made.

Figure 4:
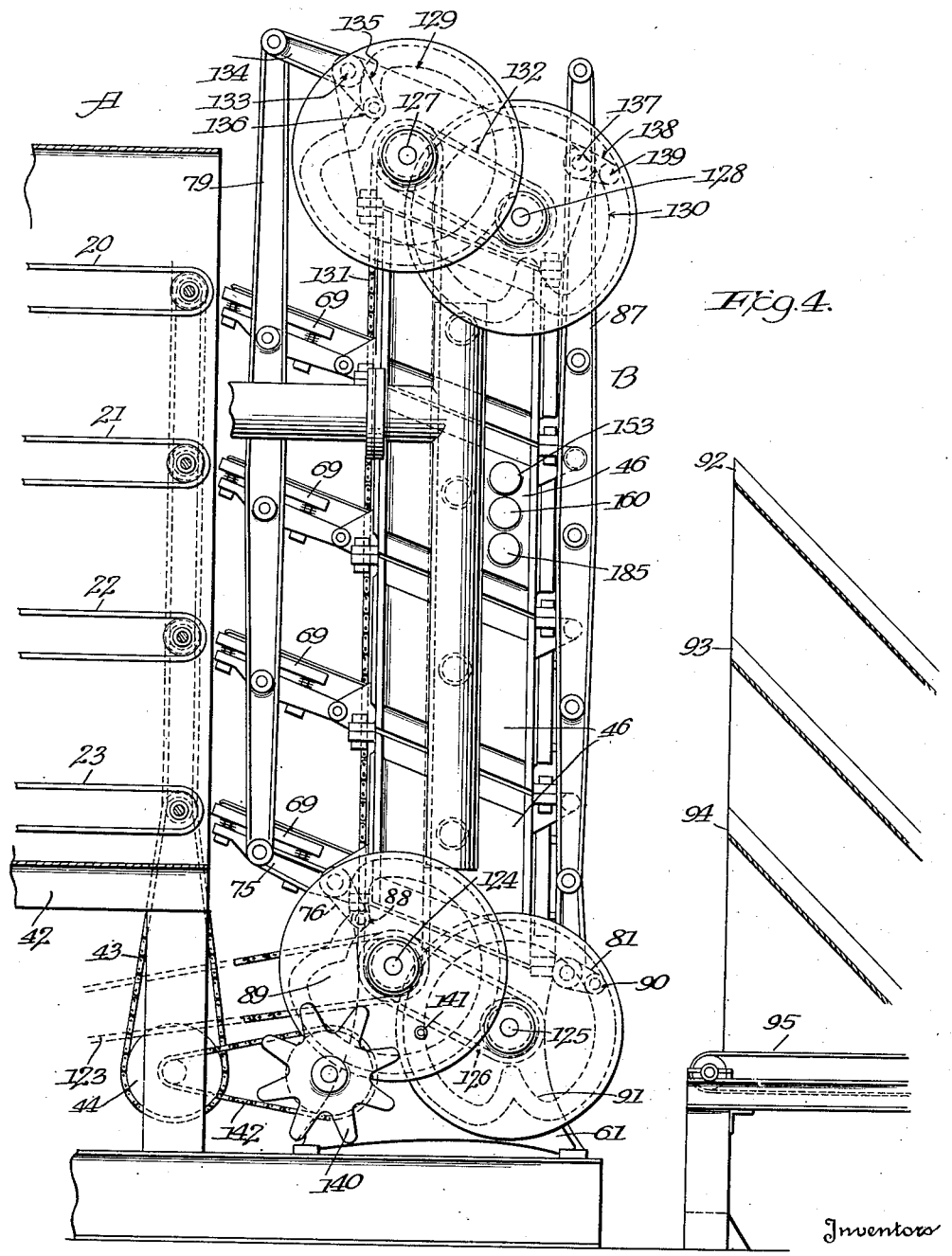
Figure 4 is a side elevation somewhat enlarged, of a vacuum unit appearing at the right of Figure 1.

Reference numerals 150 and 151 designate the negative and positive leads from a suitable source of current supply, the leads having a master switch 157 therein. Lead 150 extends to a terminal 152 of a normally open vacuum switch 153 which has communication with a cooling chamber 46, as indicated in Figure 4, so as to be responsive to conditions in the latter. The switch 153 is so designed as to close when any substantial degree of vacuum exists in its associated chambers. From the other terminal of the switch 153, a conductor 154 extends to a conductive segment 155 on a distributor wheel 156 which may be fixed on shaft 124 which carries cam 89. The wheel 156 is of conductive material and segment 155 is fully insulated therefrom.

A conductor 158 extends from lead 150 to one terminal 159 of a normally closed vacuum switch 160 which has communication with a chamber 46 so as to be responsive to conditions in the latter. The switch 160 is so designed as to be open when there is any degree of vacuum in the cooling unit. A conductor 161 extends from the other terminal of switch 160 to a conductive segment 162 set in the periphery of wheel 156 and fully insulated from the wheel. A conductor 163 extends from conductor 158 to the body of wheel 156.

A brush 164 is arranged to contact the periphery of wheel 156 and the insulated segments 155 and 162. From the brush, a conductor 165 extends to a contact 166 of a relay 167, the latter including a contactor 168 adapted, upon energization of the relay, to bridge contact 166 and a contact 169. From the latter a conductor 170 extends to one brush of the motor 105.

From the other brush of the motor, a conductor 171 extends to a contact 172 of relay 167 and upon energization of the latter a contactor 173 is adapted to bridge contact 172 and a contact 174. A conductor 175 extends from lead 151 to contact 174 of the relay and also to the coil 176 thereof, the other end of the coil being led through a conductor 177 to a connection with conductor 170 and to a terminal 178 which is adapted to be placed in connection with line 150 by a push button 179.

From terminal 178, a conductor 180 extends to a conductive segment 181 set in the periphery of a distributor wheel 182 which is of non-conductive material. Wheel 182 may be fixed on shaft 124 to rotate with wheel 156 and cam 89.

A brush 183 is arranged to wipe segment 181 and from it, a conductor 184 is led to the coils of the solenoid operated valves 111, 113 and 119, the other ends of the coils being connected to a conductor 185 which joins a conductor 186 leading to a contact 187 of a vacuum switch 188. From the other contact of switch 188 a conductor 189 extends to a contact 190 of a relay 191. Contact 190 and a contact 192 are bridged by a contactor 193 when the coil 194 of the relay is energized. Contact 192 is in connection with the conductor 195 which extends to the lead 151. The relay 191 also includes contacts 196 and 197 which are bridged by a contactor 198 when coil 194 is energized. Contact 196 is in connection with conductor 180 and contact 197 is in connection with one end of coil 194, the other end of the coil being in connection with conductor 195. Also, contact 197 is in connection with conductor 184 through a conductor 199.

Cam 91 is shown in Figure 14 in its correct angular relation to cam 89 and it will be recalled that its shaft 125 is rotated at the same speed and in the same direction as the shaft 124 which carries cam 89 and the distributors 156 and 182.

It will be assumed that the system is to be started with the parts in the positions shown in Figure 14. The electrical circuits are dead and valve 111, which is in the vacuum line, is closed as is also valve 119 which controls the cooling water supply for the condenser. The valve 113 which controls the vacuum release is open. Due to the action of cam 91, the discharge doors 83 have been closed sometime previously and roller 88 has reached approximately the point x on the surface 89b of cam 89 so that the charging doors 63 have just been closed upon a charge in the chambers.

Upon depressing push button 179, a circuit is established between leads 150 and 151 through conductor 177, coil 176 of relay 167 and conductor 175 so that contactors 168 and 173 are moved to closed position. A motor circuit is established between leads 150 and 151 through conductors 158 and 163, the body of wheel 156, brush 164, conductor 165, contactor 168, conductor 170, motor 105, conductor 171, contactor 173 and conductor 175, and a holding circuit is established between contacts 169 and 174 of the relay.

Simultaneously, relay 191 has been energized through conductor 180, segment 181, brush 183, conductors 184 and 199, and conductor 195. The solenoid windings are energized as contactors 193 and 198 are moved to closed position and a holding circuit is established for the relay since vacuum switch 188 is closed. This last named switch is in connection with a vacuum chamber 46 so as to act in response to conditions in the latter. The switch is normally closed and is designed to open when the maximum required vacuum has been induced in the chambers and it may be regulated to open under various degrees of vacuum so as to accommodate varying requirements of the products.

Segment 181 now passes away from brush 183 but this does not effect the operation of the apparatus since a holding circuit, including conductor 177, has been established for relay 191. The motor and vacuum pump are running and the vacuum chambers are being exhausted. If a substantial degree of vacuum has been induced in the chambers by the time the segment 155 reaches brush 164, the operation of the motor will not be affected since its circuit will be completed through vacuum switch 153 (which will be closed), and conductor 154, instead of through conductor 163. The brush 164 has a sufficient angular contact with wheel 156 so that the leading portion of segment 155 will reach it before the periphery of wheel 156 has entirely passed from it, that is to say, the brush is designed to bridge the insulation between the body of the wheel and the segment.

Continued rotation, however, brings the segment alone under the brush and if switch 153 is open, relay 167 will kick out, and the motor 105 will stop. Upon such an occurrence, the operator can tell immediately by observing the position of wheel 156 that the vacuum producing means are out of order.

As the vacuum pump continues to operate and the required degree of vacuum is reached in the chambers, vacuum switch 188 will temporarily open, thus causing the coils of valves 111, 113 and 119 to be deenergized. Consequently, the suction conduit controlled by valve 111 is immediately closed as is also the water supply line controlled by valve 119. Valve 113 returns to open position so that the vacuum chambers 46 are placed in communication through pipe 114, condenser 110 and pipe 112 with the interior of chamber A and air from the interior of the latter immediately passes to the cooling chambers to relieve the vacuum condition therein. The utilization of this air for vacuum release will be seen to be ideally suitable in that oven fresh bread flavors will be entrained therein.

Shortly before a point approximately at y on periphery 91b of cam 91 reaches its associated roller 90 (which means that the discharge doors 83 are about to be opened) and after vacuum release has supposedly been completed, segment 162 comes under brush 164 in the manner previously described with reference to segment 155. If vacuum switch 160 is closed, operation continues uninterrupted, but if there has not been proper vacuum release, switch 160 will be open and the motor will stop. Under the latter conditions, the operator is at once advised that the vacuum releasing means are out of order.

After segment 162 passes brush 164, thus showing that proper vacuum release has been effected, the depressed portion 91a of cam 91 will reach roller 90, the discharge doors 83 will be opened, and loaves will immediately slide therefrom to the chutes and table as before described. After the doors 83 have been closed, the depressed portion 89a of cam 89 reaches roller 88 and the charging doors 69 are opened, a charge is delivered to the chambers, and the doors are then closed. The cycle has now been completed and the parts are back in the position shown. As segment 181 comes under brush 183, the solenoids are again energized and the vacuumizing and releasing operations recur. The operating cycle is continuously repeated so long as the unit is functioning properly or until switch 157 is opened.

If, due to some cause, the apparatus has stopped with segment 181 just beyond brush 183, and with wheel 156 still in engagement with brush 164 in advance of segment 115, a special provision is necessary in order to effect resumption of operation. If, under the circumstances just mentioned, push button 179 is depressed and the motor started, it will stop as soon as segment 155 is fully under brush 164 for the reason that switch 153 will be open. Since segment 181 was in a position beyond brush 183, depression of push button 179 did not energize relay 191 and consequently, valve 111 has remained closed. Since it is closed, no vacuum condition will be induced in the chambers 46 and, consequently, vacuum switch 153 will remain open. To correct this condition, a connection 184a closable by a push-button 184b is provided between conductors 180 and 184 in advance of segment 181 and brush 183, and by depressing push button 184b a circuit is completed for relay 191, push button 179 being still held depressed.

A modified form of cooling unit is shown in Figures 6 to 11 which will now be referred to.

Figure 6:
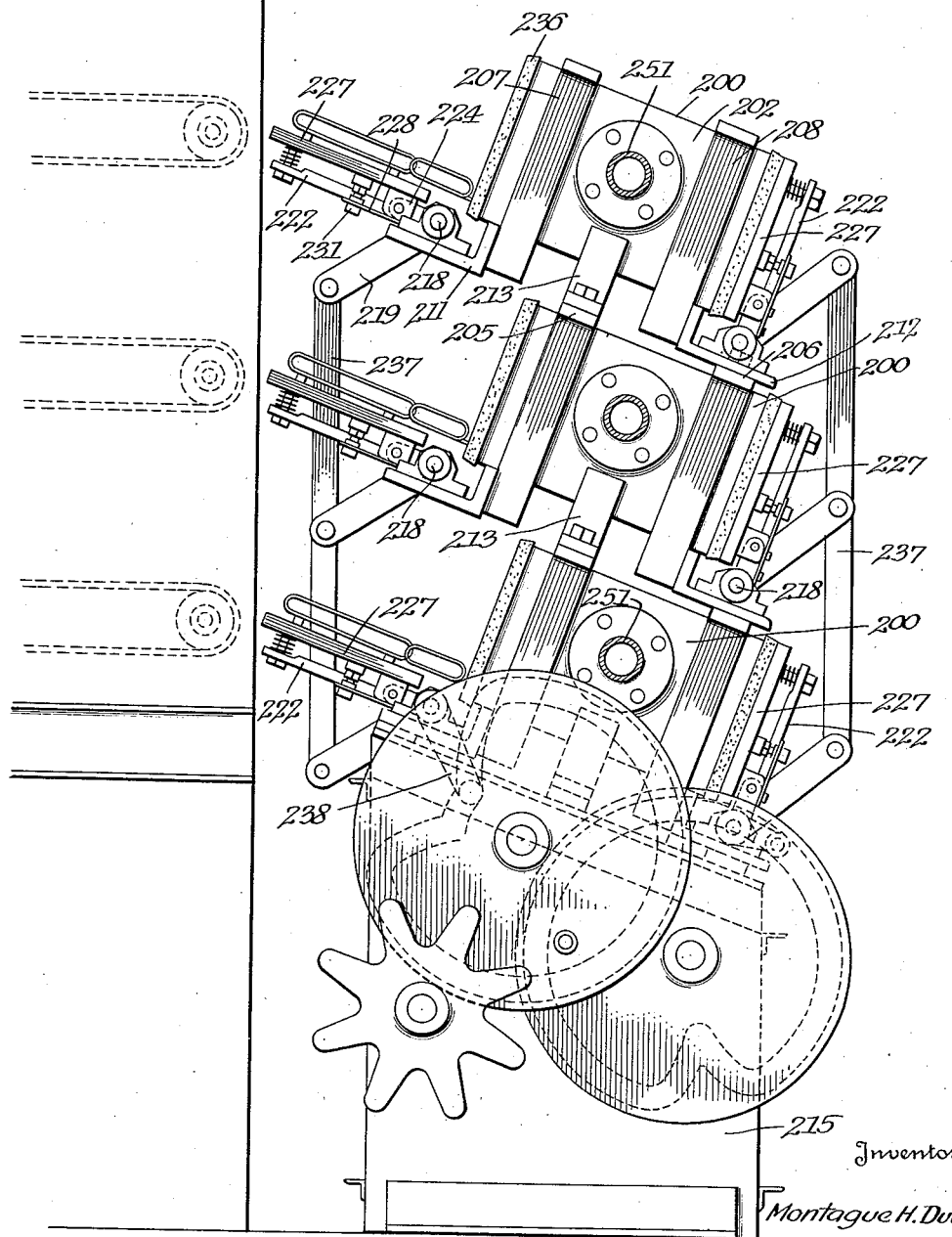
Figure 6 is a side elevation of a modified form of vacuum unit.

The unit shown in Figure 6 comprises three superposed chambers 200 in receiving relation to the three conveyors in the tempering chamber. The chambers are rectangular in longitudinal and transverse section and each includes the side walls 201 and 202 and the top and bottom walls 203 and 204, the walls consisting of metal plates welded together to form a box with open ends. Bars 205 and 206 are welded across the top wall 203 and project substantially beyond the latter. Beneath the projecting ends of bars 205 and 206, bars 207 and 208 are welded to the side wall 202 and bars 209 and 210 are welded to the side wall 201, these projecting substantially below the bottom wall 204. An angle 211 is welded to the forward edges of bars 207 and 209 and to the bottom wall 204 and a similar angle 212 is similarly secured at the rear of the chamber. The angles 211 and 212 project beyond the side walls and side bars, as do also the top bars 205 and 206, and feet 213 and 214 welded to the side walls between the side bars have the same projection.

In installation, the bottom chamber 200 is supported at a suitable inclination on a base 215. The feet 213 and 214 of the next chamber are secured to the projecting ends of the forward top bar 205 and the projecting portions of angle 212 are secured to projecting portions of the bar 206. In this manner, a battery of the desired number of chambers may be built up, the relation of parts being such that the chambers lie between parallel vertical planes.

Bearing blocks 216 and 217 mounted at the ends of angle 211 support a rock shaft 218 which has fixed thereto an arm 219 outwardly of block 216. Between the blocks 216 and 217 and additional blocks 220 and 221 (Figure 9) shaft 218 has fixed thereon an arm 222. Loosely mounted on the shaft 218 somewhat inwardly of the outer bearing blocks is a pair of arms 223 and 224 whose outer perforated ends receive pivot bolts 225 and 226 which are supported between ears formed on the outside of a cover plate or door 227.

Fixed to arms 223 and 224 are flat springs 227' and 228 whose bifurcated ends are slidably received in annular recesses, as at 229 (Figure 11), of studs 230 and 231 screwed into threaded protuberances as at 232 on door 227 and locked. Arm 222 has an axially elongated slot 232 which receives the end of the bolt 233, as shown in Figure 10. Lock nuts 234 are screwed on the projecting end of bolt 233 and a compression spring 235 is interposed between the door and the end of the arm.

The door 227 is of a size to close the front opening of chamber 200 and the forward edges of the chamber walls have fitted thereon a continuous gasket 236 formed with a channel in which the edges of the walls are received and gripped so that the gasket is retained in position. When the door is swung to closed position, its top portion is yieldingly pressed against the gasket by arm 222 through spring 235 and the lower portion of the door is yieldingly urged by the flat springs 227' and 228. Thus, it is assured that the door will be evenly fitted against the gasket. It will be understood that any great seating pressure is not required of the springs, since as soon as a vacuum condition exists in the chamber the door is drawn powerfully against the gasket 236.

The arms 219 are pivoted to a link 237 (Figure 6) and the lowermost rock shaft 218 has fixed thereon a crank arm 238 which cooperates with an actuating cam in the manner described in connection with the first embodiment so that the doors are simultaneously movable between open and closed positions. The same door structure is provided at the rear of the chamber and discussion thereof is accordingly thought to be unnecessary.

Referring to Figures 7 and 8, the door 227 has fixed thereto short pedestals 239 which support parallel strips 240 to which are fixed the cross wires 241 whose lower ends are pivoted to wires 242 which are held in parallel relation by strips 243. Outwardly of wires 242 strips 243 have fixed thereto upstanding wire loops 245 and 246 whose forward ends lap the lower extremities of similar loops 247 and 248, fixed on strips 240, the loops serving as lateral guards to prevent the loaves from sliding off the grills constituted by the wires 241 and 242.

The inner ends of wires 242 are bent downwardly and rest slidably on the bottom chamber wall 204, the main portions of the wires being elevated above the bottom wall. The wires 242 are alternated with the similar wires of a grill 247 pivoted to a grill 248 secured to the rear chamber door. The loaves are kept out of contact with the chamber side walls by means of grills 249 and 250 secured to the latter.

As the door 227 is opened, the grills associated therewith take the relation shown in Figures 7 and 8 and provide a substantially planar transfer chute for the loaves. When the door is closed, the wires 242 slide under the loaves and assume the relation in which the wires 247 are shown.

In Figure 6, reference numeral 251 designates fittings by means of which the chambers are adapted to be connected to a manifold, not shown.

In Figures 12 and 13, we have shown a system comprising a pair of conveyors 252 and 253 associated with a pair of rotary vacuum chambers or drums 254. These drums may be conveniently made from large diameter iron or steel pipe cut to the desired length and closed or headed at the ends, the end walls having trunnions fixed thereto centrally and journalled in a frame 255. One of the trunnions of each drum, indicated at 256, is hollow and connects the interior of the chamber or drum with the manifold to which the suction pump is connected.

The drum has an opening 257 extending from end to end and registering with the open end of a wire rack 258 which is mounted in the drum and is adapted to receive and support the loaves. The loading position of the drums is as shown in the drawings and in this position a transfer rack or grill 259 extends in alignment with the lower portion of rack 258 so as to guide the loaves to the latter from the associated conveyor. The rack 259 has an arcuate portion 260 in close proximity to the drum periphery and extending up to an arcuate door 261 which is positioned directly below the drum.

The door 261 is pivotally suspended from arms as at 262 which are pivoted on brackets as at 263 projecting from the base 255. The outer end of one of the supporting arms for each drum is pivoted to a block 264 normally centrally positioned by means of compression springs 266 and 267 in a longitudinally extending slot formed in bar 265. The lower end of the bar 265 carries a roller 267 engaged in the groove of a face cam 268.

The cam 268 is fixed on a shaft 269 journaled on the base 255. Peripherally the cam body is provided with three spaced series of teeth 270, 271 and 272. Fixed to the shaft 269 is a sprocket 273 which is connected by a chain 274 with the output sprocket 275 of a speed reducer 276 driven from any suitable source of power.

The series of teeth 270, 271 and 272 are adapted to engage successively a gear 277 mounted on a shaft 278 and fixed to a sprocket 279 which is connected by a chain 280 with a sprocket 281 fixed to the lower drum, a second sprocket on the said drum being connected by a chain 282 with a sprocket of equal size fixed to the upper drum. Both drums must therefore rotate in the same direction and at the same speed.

With the roller 267 in the portion 283 of the cam groove, the bar 265 is in a relatively elevated position and the doors 261 are spaced from the drum periphery as shown. The drums have been charged and the teeth 270, moving in a clockwise direction, have just engaged the gear 277 to initiate rotation of the drums in a counter-clockwise direction. Teeth 270 pass from engagement with gear 277 as the drum openings 257 come directly above doors 261 and the drum rotation ceases. Hereupon, the roller 267 moves into portion 284 of the cam groove, bar 265 is dropped and the doors 261 are moved upwardly so that their gaskets as at 285, are pressed against the margins of the openings 257. The doors are thus held while the cam rotates through an angle equal to that of groove portion 284 and during this period vacuumization and release takes place.

After release of the vacuum has occurred, roller 267 moves again into portion 283 of the cam groove so that bar 265 is lifted and doors 261 are lowered away from the drum. Teeth 272 now engage gear 277 and the drums are rotated until the lower portions (initially the top portions) of racks 258 are in alignment with discharge racks 286, these being in the planes of the transfer racks 259. The loaves slide out of the drums onto racks 286 as teeth 272 leave gear 277 and shortly thereafter, the teeth 271 come into engagement with gear 277 and the drum is moved from discharging position to the charging position shown. The described cycle is then repeated.

The loaves are held out of contact with the drum walls by the racks 258. As the charged drum is rotated, the loaves are held in by the rack portion 260 and from that they pass to a grill 287 mounted on door 261.

The drum trunnions may have a relatively tight fit in their bearings so as to afford a friction effect which will prevent the drums from over-riding their rest positions. Or the cam groove portion 283 may be provided with dips 283a and 283b so that the doors will be momentarily lifted and applied to the drums as brakes as teeth 272 and 271, respectively, pass from gear 277. The drum surfaces may be relieved as shown in Figure 13 to receive the grills 287 and permit the gaskets 285 to engage the drums securely and instantly stop them.

The control system of Figure 14 may be utilized in connection with the installation just described merely by mounting the distributor wheels 156 and 182 for rotation in proper relation with cam 268. Also, the cam may be provided with a stud and roller for coaction with a star wheel hereinbefore described for the purpose of driving the conveyors. Since these adaptations are obvious, no detailed showing is here required.

Rheostats may be employed to control motor operation and thus vary the speed of the cycle in accordance with requirements. In a single motor installation such as disclosed in Figure 1, for example, speeding up of the motor will cause the loaves to move more rapidly through the tempering chamber, thus reducing the tempering period. This reaches its limit, however, when the speed is such that the vacuum pump can no longer create the necessary vacuum in the vacuum chambers during the correspondingly shortened cooling period. If the necessary stage of vacuum can be reduced, vacuum switch 188 may be set accordingly and the situation thus taken care of. Otherwise a vacuum pump of greater capacity may be used.

The automatic systems described are, of course, desirable, but in small installations, for example, the chamber doors may be controlled manually by levers at the receiving end of the tempering chambers and a hand wheel may be provided at that point for moving the conveyors.

It will be understood that the invention is susceptible of varied embodiment, and that, accordingly, we do not limit ourselves except as in the following claims.

We claim:

1. Apparatus of the class described comprising a tempering chamber, conveying mechanism for moving hot bakery products through said chamber while being tempered therein, a vacuum chamber having an opening through which the tempered products are receivable from the conveying mechanism, a door hinged to said chamber and controlling said opening, and means for opening said door to permit access of tempered products to the vacuum chamber and for advancing said conveying mechanism.

2. Apparatus of the class described comprising a tempering chamber, conveying mechanism arranged in said chamber to receive hot bakery products at one end of said chamber and discharge them at the other, a vacuum chamber having a charging opening at the discharge end of said conveying mechanism, a door hinged to said chamber and controlling said opening, means for opening said door and for advancing said conveying mechanism whereby to charge said vacuum chamber through said opening, said last-named means including means for closing said door, said vacuum chamber having a discharge opening, a door controlling the said discharge opening, and means for closing the last-mentioned door so that vacuumization may be carried out while the first mentioned door is closed and then for opening said last-mentioned door to permit discharge of the products.

3. Apparatus of the class described comprising a tempering chamber, conveying mechanism arranged in said chamber to receive hot bakery products at one end of said chamber and discharge them at the other, a vacuum chamber having an opening at the discharge end of said conveying mechanism, a door controlling said opening, a motor, and merging gearing trains driven by said motor for opening said door and for advancing said conveying mechanism to charge said vacuum chamber through said opening.

4. Apparatus of the class described comprising a vacuum chamber having an opening through which charges of bakery products may be delivered to the chamber for cooling and a second opening for the discharge of the cooled products, doors for controlling said openings, a motor, and automatic means driven by said motor for operating said doors, said automatic means including cam mechanism arranged to effect the opening and closing of said doors to admit or discharge bread in predetermined sequence and in such manner that the discharge door will be substantially closed when the charging door is in charging position.

5. Apparatus of the class described comprising a rotary chamber having a peripheral opening, a door for said opening mounted independently of said chamber, means effective to rotate the chamber to bring its opening in register with said door and after an interval of rest to impart a further rotative movement to said chamber, and means effective to close said door to seal the chamber at the beginning of said interval and to open the door at the end of said interval.

6. Apparatus of the class described comprising a rotary chamber having a peripheral opening, a door for said opening mounted independently of said chamber, means effective to rotate the chamber to bring its opening in register with said door, and after an interval of rest to impart a further rotative movement to said chamber, means effective to close said door to seal the chamber at the beginning of said interval and to open the door at the end of said interval, and means effective to induce a vacuum in the chamber and to release the vacuum while the chamber is sealed.

7. Apparatus of the class described comprising a chamber having an opening, a door for controlling said opening, a vacuum pump in connection with said chamber, a motor for driving said pump, and pressure responsive means effective to stop said motor if a certain degree of vacuumization has not been attained within a certain interval after said door has been closed.

8. Apparatus of the class described comprising a chamber having an opening, a door for controlling said opening, means for closing the door and for opening it again after a certain interval, a vacuum pump in communication with said chamber, a motor for driving said pump, whereby to induce a vacuum in said chamber during said interval, means for releasing the vacuum at the end of said interval, and pressure responsive means effective to stop said motor if vacuum release has not been effected at the expiration of said interval.

9. Apparatus of the class described comprising a chamber having an upright opening, a door hinged to said chamber on a horizontal axis at the lower edge of said opening for controlling said opening, the lower edge of said door when it is open being spaced from the lower edge of said opening, and means hingedly connected to the door for bridging the space between the door and chamber opening when the door is open, said bridging means serving as a support for articles fed to the chamber.

10. Apparatus of the class described comprising a chamber having an upright opening, a door hinged to said chamber on a horizontal axis at the lower edge of said opening for controlling said opening, the lower edge of said door when it is open being spaced from the lower edge of said opening, and means hingedly connected to the door for bridging the space between the door and chamber opening when the door is open, said bridging means serving as a support for articles fed to the chamber, and serving as a support for the articles in the chamber when the door is closed.

11. Apparatus of the class described comprising a chamber having an upright opening, a door hinged to said chamber on a horizontal axis at the lower edges of said opening for controlling the opening, the lower edge of said door when it is open being spaced from the lower edge of said opening, said door including a grill fixed to its inner face, and a second grill hinged to the first so as to overlie the chamber bottom when the door is closed, said second grill bridging the space between the door and chamber opening when the door is open and serving as a support for articles fed to the chamber.

12. Apparatus according to claim 11 wherein the chamber has a second opening opposite the first and a door mounted and equipped as the first, and wherein the second grills are in telescoped relation when both doors are closed.

13. Apparatus of the class described comprising a tempering chamber, conveying mechanism arranged in said chamber to receive hot bakery products at one end of said chamber and discharge them at the other, a vacuum chamber having an opening through which charges may be delivered to the vacuum chamber for cooling and a second opening for the discharge of the cooled products, doors for controlling said openings, a motor, merging gearing trains driven by said motor for operating said doors in a predetermined sequence wherein both doors are closed for a period to seal said chamber, and means effective during said period to create a vacuum in said chamber.

14. Apparatus of the class described comprising a tempering chamber, conveying mechanism arranged in said chamber to receive hot bakery products at one end of said chamber and discharge them at the other, a vacuum chamber having an opening through which charges may be delivered to the vacuum chamber for cooling and a second opening for the discharge of the cooled products, doors for controlling said openings, a motor, and merging gearing trains driven by said motor for operating said doors and for advancing said conveying mechanism to charge said chamber through the charging opening.

MONTAGUE H. DUVAL.
RALPH VEZIN.